United States Patent
Mella et al.

(10) Patent No.: US 7,583,969 B2
(45) Date of Patent: Sep. 1, 2009

(54) METHOD OF COMMUNICATION

(75) Inventors: Perttu Mella, Lepsämä (FI); Jyri Karbu, Vantaa (FI); Pekka Marjelund, Muijala (FI); Vesa Sakko, Vantaa (FI); Petri J. Vuorinen, Espoo (FI); Jukka Nauha, Espoo (FI); Pekka Tapani Kohonen, Espoo (FI)

(73) Assignee: Nokia Corporation, Espoo (FI)

( * ) Notice: Subject to any disclaimer, the term of this patent is extended or adjusted under 35 U.S.C. 154(b) by 865 days.

(21) Appl. No.: 10/862,468

(22) Filed: Jun. 8, 2004

(65) Prior Publication Data

US 2005/0163074 A1    Jul. 28, 2005

(30) Foreign Application Priority Data

Jan. 23, 2004    (GB)    ................................. 0401483.3

(51) Int. Cl.
  *H04W 72/00*    (2009.01)
(52) U.S. Cl. ....................................... 455/450; 455/453
(58) Field of Classification Search ................. 370/437; 455/450, 464, 509, 511, 515, 103, 199.1, 455/425, 453
See application file for complete search history.

(56) References Cited

U.S. PATENT DOCUMENTS

| 7,027,811 B2 * | 4/2006 | Pedlar ........................ 455/425 |
| 2003/0012217 A1 * | 1/2003 | Andersson et al. .......... 370/437 |
| 2004/0224688 A1 | 11/2004 | Fischer | |

FOREIGN PATENT DOCUMENTS

| EP | 1389889 A1 | 2/2004 |
| EP | 1475983 A1 | 11/2004 |
| WO | WO 0076245 A1 | 12/2000 |

* cited by examiner

*Primary Examiner*—Tu X Nguyen
(74) *Attorney, Agent, or Firm*—Squire, Sanders & Dempsey L.L.P.

(57) ABSTRACT

A method of communications in a cellular telecommunications network is disclosed. A cell update message is sent from a user equipment to a network node. The cell update message comprises a cell update cause. The cell update cause includes one of information indicating user data transmission or information indicating control data transmission, if the cause of the cell update is a uplink data transmission. A first procedure is used for data transmission if said information is user data transmission. A different second procedure is used for data transmission if said information is control data transmission.

24 Claims, 2 Drawing Sheets

METHOD OF COMMUNICATION

FIELD OF THE INVENTION

The present invention relates to a method of communication between user equipment and a node of a network. The present invention also relates to user equipment and a network node.

BACKGROUND OF THE INVENTION

A communication system is a facility which enables communication between two or more entities such as user terminal equipment and/or network entities and other nodes associated with a communication system. The communication may comprise for example, communication of voice, electronic mail (email), text messages, data, multimedia and so on. The communication may be provided by a fixed line and/or wireless communication interfaces. A feature of wireless communication systems is that they provide mobility for the users thereof.

An example of a communications system providing wireless communication is a public land mobile network (PLMN). An example of the fixed line system is a public switched telephone network (PSTN).

The communications system typically operates in accordance with a given standard or specification which sets out what the various elements of the system are permitted to do and how that should be achieved. For example, the standard of specification may define if the user, or more precisely user equipment is provided with a circuit switched server or a packet switched server or both. Communication protocols and/or parameters which should be used for the connection are also typically defined. For example the manner in which communications are implemented between the user equipment and the elements of the communication networks is typically based on the predefined communication protocol. In other words, a specific set of "rules" on which the communication can be based needs to be defined to enable the user equipment to communicate via the communication systems.

Various different standards have been proposed or are being proposed for telecommunication networks. Examples of such proposals are the so called third generation (3G) communication systems such as UMTS (Universal Mobile Telecommunications System). This may use CDMA (Code Division Multiple Access). This means that the wireless communications between the user equipment and a node uses a spreading code to distinguish communications. GSM (Global System for Mobile communications) is another known standard which uses a time division multiple access method for communication between user equipment and a network node.

In the currently proposed UMTS third generation system there is a cell update message which is sent by the user equipment to the radio access network. This message will indicate possible causes for the cell update. There are predefined causes which can be indicated. One of these causes is that there is "uplink data transmission". This value is intended to cover both the need for user data transmission and control data transmission from the user equipment to the radio access network.

With the current proposal, the radio network controller (RNC) is not able to perform different procedures for these two different cases of uplink data transmission. This is because required information as to which case of uplink data transmission is the cause of the cell update is missing. Typically, the transmission of control data can be performed in the CELL_FACH (forward access channel) stage and the transmission of user data, when there is a large enough amount of data, is transmitted in the CELL_DCH dedicated channel state. The radio network controller is not able to perform state transition and non real time NRT DCH allocation directly based on the cell up date message. This is because the results of the traffic volume measurements are not available. Thus, the radio access network does not know based on this cell up date message whether the user equipment is going to perform for example an AMR (adaptive multi rate) call.

With the current proposal, the signalling can be summarised as follows:

The user equipment sends a cell update message to the radio network controller which sends a confirmation message back to the user equipment. The user equipment then sends a radio access network mobility information confirmation message to the RNC which replies with a measurement control message. The user equipment provides a measurement report to the RNC. The RNC makes a packet scheduling decision and allocated dedicated channel resources if required. The radio bearer is then reconfigured.

This has the disadvantage in that there is a lot of signalling required which is both time consuming and uses radio resource.

SUMMARY OF THE INVENTION

It is an aim of embodiments of the present invention to address one or more of these problems discussed.

According to one aspect of the invention, there is provided a method of communications in a cellular telecommunications network, comprising the steps of:

sending a cell update message from a user equipment to a network node, said cell update message comprising a cell update cause, said cell update cause comprising one of information indicating user data transmission and information indicating control data transmission, if the cause of said cell update is a uplink data transmission; and using a first procedure for data transmission if said information is user data transmission and using a different second procedure for data transmission if said information is control data transmission.

According to a further aspect of the invention there is provided a cellular telecommunications network, comprising user equipment and at least one network node, the user equipment being arranged to send a cell update message to a network node, said cell update message comprising a cell update cause, said cell update cause comprising one of information indicating user data transmission and information indicating control data transmission, if the cause of said cell update is a uplink data transmission and for data transmission between the user equipment and the network node using a first procedure if said information is user data transmission and using a different second procedure if said information is control data transmission.

According to another aspect of the present invention there is provided user equipment for use in a cellular telecommunications network, comprising means for determining if a cause of cell update is user data transmission or control data transmission and means for sending a cell update message to a network node, said cell update message comprising a cell update cause, said cell update cause comprising one of information indicating user data transmission and information indicating control data transmission, if the cause of said cell update is a uplink data transmission.

According to another aspect of the invention, there is provided a node for use in a telecommunications system comprising means for receiving a cell update message to a network node, said cell update message comprising a cell update cause, said cell update cause comprising one of information indicating user data transmission and information indicating control data transmission, if the cause of said cell update is a uplink data transmission and means for determining that a first procedure for data transmission is to be used if said information is user data transmission and that a second procedure is to be used for data transmission if said information is control data transmission

BRIEF DESCRIPTION OF DRAWINGS

For a better understanding of the present invention and as to how the same may be carried into effect, reference will now be made by way of example only to the accompanying drawings in which.

DETAILED DESCRIPTION OF EMBODIMENTS OF THE PRESENT INVENTION

Figure 1:
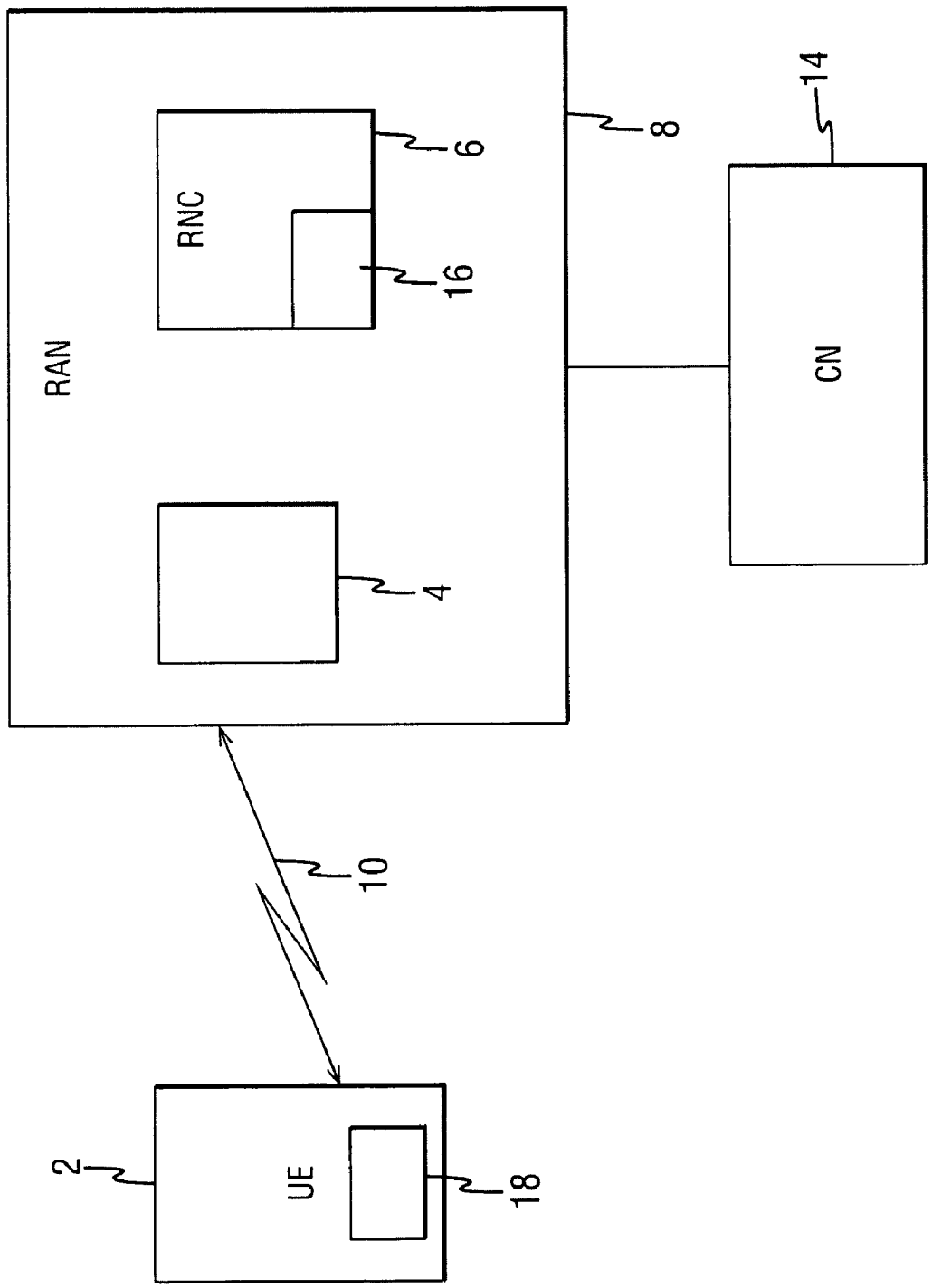
FIG. 1 shows a network within which embodiments of the present invention can be implemented.

Reference is made first to FIG. 1 which shows a system in which embodiments of the present invention can be implemented. Embodiments of the present invention will be described in the context of a third generation (3G) system and in particular the UMTS system using wideband CDMA. However, it should be appreciated that embodiments of the present invention can be applied to any other communication system including other third generation systems, future standards and even for example currently used standards such as GSM or the like.

The system comprises user equipment 2. The user equipment 2 can take any suitable form. The user equipment 2 can be a mobile telephone, a computer (fixed or portable), personal data assistance (PDA), organisers or the like.

The user equipment 2 is arranged to communicate with a radio access network 8 via a wireless connection 10. The radio access network is sometimes referred to as a UTRAN (UMTS terrestrial radio access network) in third generation systems.

The wireless connection between the user equipment 2 and the radio access network 8 may be at any suitable frequencies such as for example a radio frequency.

The radio access network 8 consists of a base station entity 4 which is sometimes referred to as node B. For the purpose of this document, the term base station will be used and is intended to cover any suitable entity which receives wireless transmissions from the user equipment and transmits wireless communications to the user equipment via the wireless interface 10.

The radio access network 8 also has a control element 6. Depending on the standard, the control element can be referred to a radio network controller in the case of the UMTS system, or base station controller in the case of a GSM system. The term radio network controller 6 is intended to cover any such control entity.

In the arrangement shown in FIG. 1, the control function is provided separately from the base station function with the single control entity controlling a number of base stations. In other embodiments of the present invention, the base stations may each incorporate part of the control function.

The radio access network is arranged to communicate with a core network 12. The core network 12 is well known and will not be described further.

Figure 2:
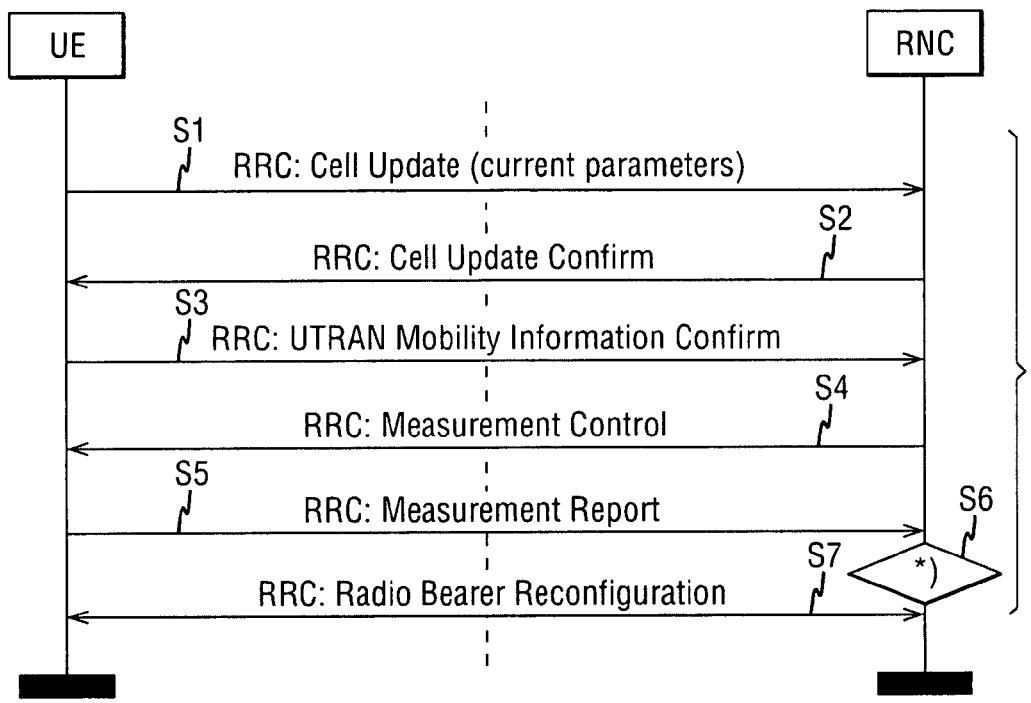
FIG. 2 shows the current signalling used.

To assist the understanding of the present invention, reference will now be made to FIG. 2 which shows the signalling currently used in the RRC protocol specification (radio resource control) as defined in the 3G specification TS 25.331, The procedure outlined below is carried out in the CELL_FACH state. In the state, the user equipment can perform the following actions: if the user equipment is in a service area maintain up to date system information as broadcast by the base station, perform cell reselection, can perform a measurement process according to measurement control information, act on RRC messages received on various other channels and so on. It should be noted that in the CELL_FACH channel, the DCH is available.

In step S1, a radio resource control RRC message is sent from the user equipment to the radio network controller. This is a cell update message. The cell up date message will include a field for the cell update cause. The current proposals list the following possibilities as a cell update cause; cell reselection; periodic cell update, up link data transmission, paging response, re-entered service area, radio link failure, RLC unrecoverable error. This example, is particularly concerned where the cell up date cause is due to uplink data transmission.

In step S2, the RNC sends the user equipment an RRC cell update confirmation message. This message confirms the cell update procedure.

In step S3, the user equipment sends a UTRAN mobility information confirmation message. Again, this is a radio resource control message. This message is used to confirm the new UTRAN mobility information for the user equipment.

In step S4, the RRC message measurement control is sent from the RNC to the user equipment. The measurement control message is used by the RNC to control a measurement in the user equipment. The following information is used to control the user equipment measurement and the measurement results reporting:

1. Measurement identity—a reference number that is used by the RNC when setting up, modifying or releasing the measurement and by the user equipment in the measurement report.

2. Measurement command—the command can be:
   Set up—set up a new measurement.
   Modify a previously defined measurement for example to change a reporting criteria.
   Release to stop a measurement and clear all information in the user equipment that is related to that measurement.

3. Measurement Type—one of the types measured below describing what the user equipment should measure, presence or absence of the following control information depends on the measurement type.

4. Measurement Objects—the objects on which the user equipment shall measure measurement quantities and corresponding object information.

5. Measurement Quantity—the quantity the user equipment shall measure on the measurement object. This also includes the filtering of the measurements.

6. Reporting quantities—the quantities the user equipment shall include in the report in addition to the quantities that are mandatory to the report for this specific event.

In this case the measurements relate to the up link traffic volume.

In step S5, the user equipment sends to the RNC a RRC measurement report message. The measurement report will include information on the measurements made. In particular it will indicate the amount of uplink traffic.

In step S6, the RNC will make packet scheduling decisions and allocation of dedicated channel resources based on the results of the traffic volume measurements. This may mean that the state transitions from CELL_FACH to the CELL_DCH and DCH allocation, if appropriate, will be carried out. For example, the transition to the CELL_DCH state and DCH allocation will occur if there is a relatively large amount of user data which needs to be transmitted. If, on the other hand, the user equipment needs to transmit control data or a relatively small amount of user data, then transmission will take place in the CELL_FACH state.

In the CELL_FACH state RACH (random access channels/FACH i.e. common channels are used and in the CELL_DCH state, dedicated DCH is used.

In step S7, the radio bearer will be reconfigured in dependence on the decision made in step S6.

Figure 3:
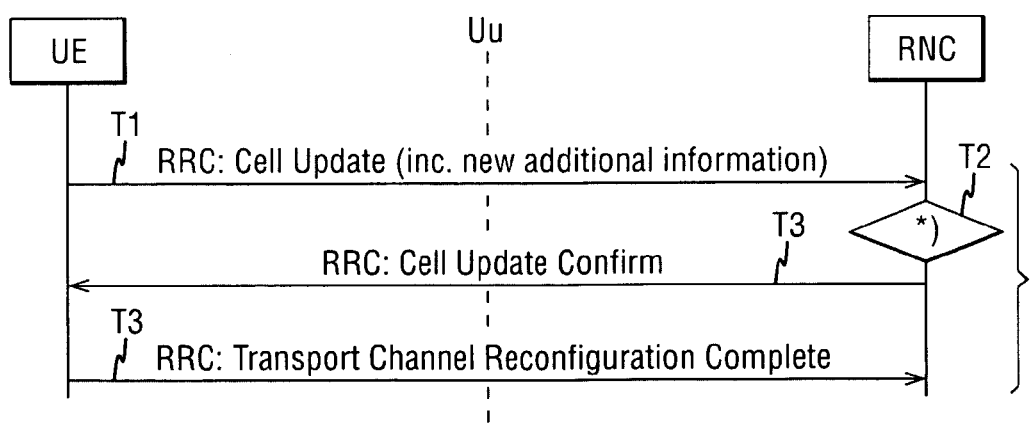
FIG. 3 shows the signalling used in embodiments of the present invention.

Reference is now made to FIG. 3 which shows the signal flow in an embodiment of the present invention. In step T1, the RRC message sent is a cell update message. However, this cell update message includes two new cause values. Instead of having a single value for uplink data transmission, this is replaced by two values, uplink user data transmission and uplink control data transmission. Thus, if the cause of the cell up date is uplink user data transmission or is uplink control data transmission, this information will be included in the cell update RRC message. By providing the RNC with information as to whether there is uplink data transmission or control data transmission, the RNC is able to perform different kind of procedures in response to the inclusion of one of the cause values. In particular, the decision making in the UTRAN is speeded up. Based on this piece of information in the cell update cause, the RNC can make a decision as to whether or not the data from the user equipment needs to be transmitted in the CELL-FACH state or in the CELL_DCH state.

In step T2 the user will make the packet scheduling decision and allocation of dedicated channel resources if required. This will take into account the information received in step T1. This contrasts with the method shown in FIG. 2 where the RNC is not in a position to make this decision only in response to the cell update message.

In step T3, the RRC radio resource control message cell update confirmation is sent from the RNC to the user equipment.

In step T4, the transport channel reconfiguration is completed. Transport channel reconfiguration is a subset of the radio bearer reconfiguration procedure. Which one is used depends on which parameters need to change. Most typical is to use radio bearer reconfiguration procedure also in this improved solution but in some cases the transport channel reconfiguration procedure is valid. If radio bearer parameters or radio bearer mapping changes in state transition: radio bearer reconfiguration complete message terminates improved signalling chart. Embodiments of the present invention are particularly applicable where the user equipment is already configured to perform the traffic volume measurement so that the user equipment is able to select the correct cell up date cause i.e. to select one of up link user data transmission or up link control data transmission.

The user equipment will select up link user data transmission if user data is to be transmitted. The user equipment will select the up link control data transmission value if control data is to be transmitted. In one embodiment of the present invention, a distinction can be made depending on the amount of user data. For relatively small amounts of user data, the up link control data transmission value can be selected whilst for relatively large amounts of user data, the up link user data transmission can be selected.

In one alternative embodiment of the invention, the call update cause may alternatively or additionally include the RRC connection establishment cause information element. Based on this information, the UTRAN knows if the UE needs to establish for example a new RAB. This means that it is possible for the UTRAN to perform the necessary procedures to establish the RAB without having to wait for further information.

Examples of establishment cause are listed below:
Originating Conversational Call,
Originating Streaming Call,
Originating Interactive Call,
Originating Background Call,
Originating Subscribed traffic Call,
Terminating Conversational Call,
Terminating Streaming Call,
Terminating Interactive Call,
Terminating Background Call,
Emergency Call,
Inter-RAT (radio access technology) cell re-selection,
Inter-RAT cell change order,
Registration, Detach,
Originating High Priority Signalling,
Originating Low Priority Signalling,
Call re-establishment,
Terminating High Priority Signalling,
Terminating Low Priority Signalling,
Terminating—cause unknown In another embodiment of the invention, the cell update message may additionally or alternatively include the measurement identity information element discussed in relation to FIG. 2 as well as the traffic volume measured results list information element. This will for example indicate the amount of uplink traffic. This information allows the RNC to perform faster state transitions and DCH allocation decisions since it is not necessary to wait for the measurement report RRC message discussed in relation to FIG. 2 from the UE. This will require that the UE is configured to make the traffic volume measurement.

In other embodiments of the invention, any other common channels may be used for the control information and/or small amounts of user data. Likewise any dedicated channel may be used in for the user data. It should be appreciated that in other embodiments of the invention any other suitable channel can be used for the control information or the user information, the channels be dedicated, common or shared channels or any other channel. To a certain extent the channel selection will be dependent on the standard in which the invention is implemented.

Embodiments of the present invention allow the RNC to perform more optimal state transitions and DCH allocations in accordance with the need of the case. The RNC can make the decisions faster and require less signalling. This means that the radio resource is not unnecessarily used.

Embodiments of the present invention may require the RRC signalling entity 16 to be modified. The RRC signalling entity 16 may be provided by a processor optionally in conjunction with a memory.

The user equipment 2 may need to be modified so as to be able to select the new parameters. This may be in response to some form of traffic analysis in terms of quantity and/or type. This will be provided by the signal processor 18 of the user equipment.

Embodiments of the present invention may find application in any suitable communications system and not just UMTS which may have a number of different variants.

The invention claimed is:

1. An apparatus, comprising:
    initiating means for initiating sending of a cell update message to a network node, the cell update message comprising a radio resource control message comprising information for use at the network node in carrying out radio resource control, and the cell update message comprising information indicative of a case of an uplink data transmission that is a cause of a cell update; and
    selecting means for selecting said information from one of information indicating that the case of the uplink data transmission that is the cause of the cell update comprises a user data transmissions, and information indicating that the case of the uplink data transmission that is the cause of the cell update comprises a control data transmission.

2. An apparatus, comprising:
    first determining means for determining, in response to a received cell update message comprising information indicative of a case of an uplink data transmission that is a cause of a cell update, that a first procedure for data transmission is to be used when said cell update message comprises information indicating that the case of the uplink data transmission that is the cause of the cell update comprises a user data transmission; and
    second determining means for determining that a second, different procedure is to be used for the data transmission when said cell update message comprises information indicating that the case of the uplink data transmission that is the cause of the cell update comprises a control data transmission, wherein the cell update message comprises a radio resource control message comprising information for use at a network node in carrying out radio resource control.

3. An apparatus, comprising:
    a processor configured to
    initiate sending of a cell update message to a network node, the cell update message comprising a radio resource control message comprising information for use at the network node in carrying out radio resource control, and said cell update message comprising information indicative of a case of an uplink data transmission that is a cause of a cell update, wherein
    said information is selected from one of information indicating that the case of the uplink data transmission that is the cause of the cell update comprises a user data transmissions and information indicating that the case of the uplink data transmission that is the cause of the cell update comprises a control data transmission.

4. An apparatus as claimed in claim 3, wherein the processor is further configured to determine whether said cell update cause comprises an uplink data transmission and, if so, to determine whether the cell update cause is to be indicated as a user data transmission or a control data transmission.

5. An apparatus as claimed in claim 4, wherein the processor is configured to determine at least one of a data amount and a data type.

6. An apparatus as claimed in claim 3, wherein said cell update message further comprises at least one of a cause of establishment of a connection, a measurement identity and traffic volume information.

7. A method, comprising:
    initiating sending of a cell update message to a network node, the cell update message comprising a radio resource control message comprising information for use at the network node in carrying out radio resource control, and said cell update message comprising information indicative of a case of an uplink data transmission that is a cause of a cell update, wherein
    said information is selected from one of information indicating that the case of the uplink data transmission that is the cause of the cell update comprises a user data transmissions and information indicating that the case of the uplink data transmission that is the cause of the cell update comprises a control data transmission.

8. A method as claimed in claim 7, further comprising:
    determining whether said cell update cause comprises an uplink data transmission and, if so, determining whether the cell update cause is to be indicated as a user data transmission or a control data transmission.

9. A method as claimed in claim 8, wherein said determining comprises determining at least one of a data amount and a data type.

10. A method as claimed in claim 7, wherein said cell update message further comprises at least one of a cause of establishment of a connection, a measurement identity and traffic volume information.

11. An apparatus, comprising:
    a processor configured to
    determine, in response to a received cell update message comprising information indicative of a case of an uplink data transmission that is a cause of a cell update, that a first procedure for data transmission is to be used when said cell update message comprises information indicating that the case of the uplink data transmission that is the cause of the cell update comprises a user data transmission1 and that a second, different procedure is to be used for the data transmission when said cell update message comprises information indicating that the case of the uplink data transmission that is the cause of the cell update comprises a control data transmission, wherein
    the cell update message comprises a radio resource control message comprising information for use at a network node in carrying out radio resource control.

12. An apparatus as claimed in claim 11, wherein said first procedure comprises transmitting data from the user equipment to the network node using a common channel.

13. An apparatus as claimed in claim 12, wherein said common channel comprises a forward access channel.

14. An apparatus as claimed in claim 11, wherein said seconds different procedure comprises transmitting data from the user equipment to the network node using a dedicated channel.

15. An apparatus as claimed in claim 11, wherein said first procedure is used when user data exceeds at least a certain amount or when any user data is to be transmitted from said user equipment to said network node.

16. A method as claimed in claim 11, wherein said seconds different procedure is used when control data or user data falling below a certain amount of data is to be transmitted from said user equipment to said network node.

17. A method, comprising:
    determining, in response to a received cell update message comprising information indicative of a case of an uplink data transmission that is a cause of a cell update, that a first procedure for data transmission is to be used when said cell update message comprises information indicating that the case of the uplink data transmission that is the cause of the cell update comprises a user data transmission1 and that a second, different procedure is to be used for the data transmission when said cell update message comprises information indicating that the case of the uplink data transmission that is the cause of the cell update comprises a control data transmission, wherein the cell update message comprises a radio resource control message comprising information for use at a network node in carrying out radio resource control.

18. A method as claimed in claim 17, wherein said first procedure comprises transmitting data from the user equipment to the network node using a common channel.

19. A method as claimed in claim 18, wherein said common channel comprises a forward access channel.

20. A method as claimed in claim 17, wherein said second, different procedure comprises transmitting data from the user equipment to the network node using a dedicated channel.

21. A method as claimed in claim 17, wherein said first procedure is used when user data exceeds at least a certain amount or when any user data is to be transmitted from said user equipment to said network node.

22. A method as claimed in claim 17, wherein said second, different procedure is used when control data or user data falling below a certain amount of data is to be transmitted from said user equipment to said network node.

23. A computer program embodied on a computer readable storage medium, the program configured to control a processor to perform a process, the process comprising:

initiating sending of a cell update message to a network node, the cell update message comprising a radio resource control message comprising information for use at the network node in carrying out radio resource control and said cell update message comprising information indicative of a case of an uplink data transmission that is a cause of a cell update, wherein said information is selected from one of information indicating that the case of the uplink data transmission that is the cause of the cell update comprises a user data transmission, and information indicating that the case of the uplink data transmission that is the cause of the cell update comprises a control data transmission.

24. A computer program embodied on a computer readable storage medium, the program configured to control a processor to perform a process, the process comprising:

determining, in response to a received cell update message comprising information indicative of a case of an uplink data transmission that is a cause of a cell update, that a first procedure for data transmission is to be used when said cell update message comprises information indicating that the ease of the uplink data transmission that is the cause of the cell update comprises a user data transmission, and that a second, different procedure is to be used for the data transmission when said cell update message comprises information indicating that the case of the uplink data transmission that is the cause of the cell update comprises a control data transmission, wherein the cell update message comprises a radio resource control message comprising information for use at a network node in carrying out radio resource control.

* * * * *

UNITED STATES PATENT AND TRADEMARK OFFICE
CERTIFICATE OF CORRECTION

PATENT NO. : 7,583,969 B2  Page 1 of 1
APPLICATION NO. : 10/862468
DATED : September 1, 2009
INVENTOR(S) : Mella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Fourteenth Day of September, 2010

David J. Kappos
*Director of the United States Patent and Trademark Office*